US012799262B2

(12) United States Patent
Ozawa et al.

(10) Patent No.: US 12,799,262 B2
(45) Date of Patent: Nov. 17, 2026

(54) CURABLE COMPOSITION, CURED PRODUCT, AND ADHESIVE

(71) Applicant: DIC Corporation, Tokyo (JP)

(72) Inventors: Ryosuke Ozawa, Ichihara (JP); Tetsuya Yamazaki, Ichihara (JP)

(73) Assignee: DIC Corporation, Tokyo (JP)

( * ) Notice: Subject to any disclaimer, the term of this patent is extended or adjusted under 35 U.S.C. 154(b) by 464 days.

(21) Appl. No.: 18/285,391

(22) PCT Filed: Apr. 7, 2022

(86) PCT No.: PCT/JP2022/017219

§ 371 (c)(1),
(2) Date: Oct. 3, 2023

(87) PCT Pub. No.: WO2022/224829

PCT Pub. Date: Oct. 27, 2022

(65) Prior Publication Data

US 2024/0132659 A1 Apr. 25, 2024

(30) Foreign Application Priority Data

Apr. 20, 2021 (JP) ................................ 2021-070961

(51) Int. Cl.

| | |
|---|---|
| ***C08G 18/58*** | (2006.01) |
| ***C08G 18/00*** | (2006.01) |
| ***C08G 18/10*** | (2006.01) |
| ***C08G 18/12*** | (2006.01) |
| ***C08G 18/24*** | (2006.01) |
| ***C08G 18/28*** | (2006.01) |
| ***C08G 18/48*** | (2006.01) |
| ***C08G 18/73*** | (2006.01) |
| ***C08G 18/75*** | (2006.01) |
| ***C08G 18/76*** | (2006.01) |
| ***C08G 18/80*** | (2006.01) |
| ***C08L 75/04*** | (2006.01) |
| ***C09J 175/00*** | (2006.01) |
| ***C09J 175/08*** | (2006.01) |

(52) U.S. Cl.

CPC .......... *C08G 18/58* (2013.01); *C08G 18/003* (2013.01); *C08G 18/10* (2013.01); *C08G 18/12* (2013.01); *C08G 18/246* (2013.01); *C08G 18/2825* (2013.01); *C08G 18/48* (2013.01); *C08G 18/4812* (2013.01); *C08G 18/4829* (2013.01); *C08G 18/4854* (2013.01); *C08G 18/73* (2013.01); *C08G 18/755* (2013.01); *C08G 18/7621* (2013.01); *C08G 18/80* (2013.01); *C08G 18/8067* (2013.01); *C08L 75/04* (2013.01); *C09J 175/00* (2013.01); *C09J 175/08* (2013.01)

(58) Field of Classification Search

CPC ........ C08G 18/58; C08G 18/10; C08G 18/48; C08G 18/80; C08G 18/003; C08G 18/12; C08G 18/246; C08G 18/2825; C08G 18/4812; C08G 18/4829; C08G 18/4854; C08G 18/755; C08G 18/7621; C08G 18/8067; C08G 18/73; C08L 75/04; C09J 175/00; C09J 175/08

See application file for complete search history.

(56) References Cited

U.S. PATENT DOCUMENTS

2021/0380749 A1 12/2021 Ota et al.

FOREIGN PATENT DOCUMENTS

| | | | | |
|---|---|---|---|---|
| JP | 2010-185034 A | 8/2010 | | |
| JP | 2012-219222 A | 11/2012 | | |
| WO | 2020/095995 A1 | 5/2020 | | |
| WO | WO-2020255844 A1 * | 12/2020 | ......... | C08G 18/4837 |

* cited by examiner

*Primary Examiner* — Rabon A Sergent

(74) *Attorney, Agent, or Firm* — Troutman Pepper Locke LLP

(57) ABSTRACT

A curable composition containing: a blocked isocyanate prepolymer containing a polyol compound, a polyisocyanate compound, a branching agent, and a blocking agent; an epoxy resin; and a curing agent and/or a curing accelerator, wherein the polyol compound is polytetramethylene glycol, the branching agent is a compound having at least three reactive functional groups capable of reacting with an isocyanate group, an amount by mole of the isocyanate group in the polyisocyanate compound is 2 mol or less relative to 1 mol of a total amount by mole of a hydroxy group in the polyol compound and the reactive functional groups capable of reacting with the isocyanate group in the branching agent, and an amount of the reactive functional groups in the branching agent is more than 50 mol % of the total amount of the hydroxy group in the polyol compound and the reactive functional groups in the branching agent.

20 Claims, No Drawings

CURABLE COMPOSITION, CURED PRODUCT, AND ADHESIVE

TECHNICAL FIELD

The present invention relates to a curable composition, a cured product, and an adhesive.

BACKGROUND ART

In recent years, light-weight materials such as aluminum, magnesium, and plastics have been increasingly used as structural materials from the viewpoint of energy saving. In an assembly, adhesives have been increasingly used instead of conjugation through welding. An adhesive for a structure such as an automobile requires favorable adhesive properties between different materials and resistance to a change of temperature and humidity in a usage environment. In order to meet the requirements, for example, an adhesive using a bisphenol type epoxy resin and a urethane-modified epoxy resin or a rubber-modified epoxy resin in combination is provided from the viewpoint of improving followability to a substrate to maintain adhesive properties (for example, see Patent Literature 1). However, when an epoxy resin is modified to introduce a flexible skeleton, there is a problem in that an enhanced requirement is not be sufficiently met due to the upper limit of introduction amount.

Therefore, a material having excellent adhesive properties is required.

CITATION LIST

Patent Literature

PTL 1: Japanese Unexamined Patent Application Publication No. 2010-185034

SUMMARY OF INVENTION

Technical Problem

An object of the present invention is to provide a curable composition capable of forming a cured product having excellent adhesive properties, a cured product of the curable composition, and an adhesive.

Solution to Problem

The present inventors have intensively investigated to achieve the object, and as a result found that the object can be achieved by using a curable composition containing a blocked isocyanate prepolymer formed from a specific polyol compound, a specific amount of a polyisocyanate compound, a specific amount of a branching agent, and a blocking agent as essential raw materials, an epoxy resin, and a curing agent or a curing accelerator. Thus, the present invention has been completed.

Specifically, the present invention relates to a curable composition containing a blocked isocyanate prepolymer (A) containing a polyol compound (a1), a polyisocyanate compound (a2), a branching agent (a3), and a blocking agent (a4) as essential raw materials, an epoxy resin (B), and a curing agent (C1) and/or a curing accelerator (C2), wherein the polyol compound (a1) is polytetramethylene glycol, the branching agent (a3) is a compound having at least three reactive functional groups capable of reacting with an isocyanate group in the polyisocyanate compound (a2), an amount by mole of the isocyanate group in the polyisocyanate compound (a2) is 2 mol or less relative to 1 mol of a total amount by mole of a hydroxy group in the polyol compound (a1) and the reactive functional groups capable of reacting with the isocyanate group in the branching agent (a3), and an amount of the reactive functional groups in the branching agent (a3) is more than 50 mol % of the total amount of the hydroxy group in the polyol compound (a1) and the reactive functional groups in the branching agent (a3), a cured product, and an adhesive.

Advantageous Effects of Invention

The curable composition of the present invention can form a cured product having excellent adhesive properties. Therefore, the curable composition can be used as a coating agent or an adhesive, and in particular can be suitably used as an adhesive.

DESCRIPTION OF EMBODIMENTS

A curable composition of the present invention contains a blocked isocyanate prepolymer (A), an epoxy resin (B), and a curing agent (C1) and/or a curing accelerator (C2).

The blocked isocyanate prepolymer (A) is formed from a polyol compound (a1), a polyisocyanate compound (a2), a branching agent (a3), and a blocking agent (a4) as essential raw materials.

As the polyol compound (a1), polytetramethylene glycol is used. The number average molecular weight of the polytetramethylene glycol is preferably within the range of 1,000 to 4,000, and further preferably 3,000 to 4,000 since the curable composition capable of forming a cured product having excellent adhesive properties can be obtained.

As the polyol compound (a1), another polyol compound can be used in addition to the polytetramethylene glycol, if necessary.

Examples of the other polyol compound include polyether polyols such as polyethylene glycol and polypropylene glycol, polyester polyols, polycarbonate polyols, and acrylic polyols. The other polyol compound may be used alone, or two or more types thereof may be used in combination.

The polyisocyanate compound (a2) is preferably a compound having at least two isocyanate groups in one molecule. From the viewpoint of easily adjusting the molecular weight of an isocyanate prepolymer (A), the polyisocyanate compound (a2) is more preferably a compound having two to four isocyanate groups, and particularly preferably diisocyanate.

Examples of the polyisocyanate compound (a2) include propane-1,2-diisocyanate, 2,3-dimethyl-2,3-diisocyanate, 2-methylpentane-2,4-diisocyanate, octane-3,6-diisocyanate, 3,3-dinitropentane-1,5-diisocyanate, octane-1,6-diisocyanate, 1,6-hexamethylenediisocyanate (HDI), trimethylhexamethylene diisocyanate, lysine diisocyanate, tolylene diisocyanate (TDI), xylylene diisocyanate, metatetramethylxylylene diisocyanate, isophorone diisocyanate (3-isocyanatomethyl-3,5,5-trimethylcyclohexylisocyanate), 1,3- or 1,4-bis(isocyanatomethyl)cyclohexane, diphenylmethane-4,4'-diisocyanate (MDI), dicyclohexylmethane-4,4'-diisocyanate (hydrogenated MDI), and hydrogenated tolylene diisocyanate, and a mixture thereof. The polyisocyanate compound may be used alone, or two or more types thereof may be used in combination.

Among these, from the viewpoint of easily controlling a reaction with the polyol compound (a1) and availability of the raw material, hexamethylene diisocyanate, tolylene diisocyanate, xylylene diisocyanate, isophorone diisocyanate, diphenylmethane diisocyanate, and dicyclohexylmethane-4, 4'-diisocyanate are preferred, and isophorone diisocyanate is more preferred.

From the viewpoint of easily adjusting the molecular weight of a prepolymer to be obtained and decreasing an unreacted polyisocyanate, as the amount of the used polyisocyanate compound (a2), the amount of isocyanate group is 2 mol or less relative to 1 mol of a total amount of reactive functional groups capable of a hydroxy group in the polyol compound (a1) and an isocyanate group in the branching agent (a3) described below, and is preferably within the range of 1.6 to 1.8 mol since a curable composition capable of forming a cured product having excellent adhesive properties can be obtained.

As the branching agent (a3), a compound having at least three reactive functional groups capable of reacting with an isocyanate group in the polyisocyanate compound (a2) is used.

Examples of the reactive functional groups capable of reacting with the polyisocyanate compound (a2) include a hydroxy group, an amino group, and a carboxyl group. The compound may have the reactive functional groups alone or two or more types thereof.

Examples of the branching agent (a3) include polyether triol, polyether triamine, and trimer acid. The branching agent may be used alone, or two or more types thereof may be used in combination. Among these, polyether triol is preferred since the curable composition capable of forming a cured product having excellent adhesive properties can be obtained.

The number average molecular weight of the branching agent (a3) is preferably within the range of 300 to 3,000 since the curable composition capable of forming a cured product having excellent adhesive properties can be obtained.

The amount of the reactive functional groups in the branching agent (a3) is more than 50 mol %, and is preferably within the range of 55 to 65 mol % of the total amount of the hydroxy group in the polyol compound (a1) and the reactive functional groups in the branching agent (a3) since an increase in viscosity of the blocked isocyanate prepolymer obtained is suppressed to maintain the workability and the curable composition capable of forming a cured product having excellent adhesive properties can be obtained.

Examples of the blocking agent (a4) include active methylene compounds such as a malonic acid diester (diethyl malonate, etc.), acetylacetone, and an acetoacetic acid ester (ethyl acetoacetate, etc.); oxime compounds such as acetoxime, methyl ethyl ketoxime (MEK oxime), and methyl isobutyl ketoxime (MIBK oxime); amine compounds such as diisopropylamine, benzylamine, and dicyclohexylamine; monohydric phenol compounds such as phenol, cresol, ethylphenol, n-propylphenol, isopropylphenol, butylphenol, tertiary butylphenol, octylphenol, nonylphenol, dodecylphenol, cardanol, cyclohexyphenol, chlorophenol, and bromophenol; dihydric phenol compounds such as resorcin, catechol, hydroquinone, bisphenol A, bisphenol S, bisphenol F, and naphthol; ε-caprolactone, and ε-caprolactam. The blocking agent may be used alone, or two or more types thereof may be used in combination. Among these, a monohydric phenol compound is preferred since the curable composition capable of forming a cured product having excellent adhesive can be obtained.

A method for producing the blocked isocyanate prepolymer (A) is not particularly limited. Examples thereof include a method in which an excessive amount of the isocyanate group in the polyisocyanate compound (a2) is reacted with the hydroxy group in the polyol compound (a1) and the reactive functional groups in the branching agent (a3), and the rest of the isocyanate group are then blocked using the blocking agent (a4).

The reaction of the polyol compound (a1) with the polyisocyanate compound (a2) and the branching agent (a3) is not particularly limited, and can be performed through a common urethane-forming reaction. The reaction temperature in the reaction is preferably within the range of 40 to 140° C., and more preferably within the range of 60 to 130° C. A catalyst for urethane polymerization may be used to promote the reaction.

Examples of the catalyst for urethane polymerization include organometallic compounds such as dioctyltin dilaurate, dibutyltin dilaurate, tin(II) octoate, stannous octoate, lead octylate, lead naphthenate, and zinc octylate, and tertiary amine-based compounds such as triethylenediamine and triethylamine. The catalyst for urethane polymerization may be used alone, or two or more types thereof may be used in combination.

A blocking method using the blocking agent (a4) may be performed by a publicly known blocking reaction. The amount of the used blocking agent (a4) is preferably within the range of 1 to 2 equivalents, and more preferably within the range of 1.05 to 1.5 equivalents relative to the excessive isocyanate group, that is, a free isocyanate group.

The blocking reaction using the blocking agent (a4) is a method in which the blocking agent (a4) is added in a final reaction of common urethane polymerization. The blocking agent (a4) may be added and reacted at an optional stage of urethane polymerization, to a blocked isocyanate prepolymer.

A method for adding the blocking agent (a4) may be a method in which the blocking agent is added at the predetermined end of polymerization, a method in which the blocking agent is added at the early stage of polymerization, or a method in which a part of the blocking agent is added at the early stage of polymerization and the balance is added at the end of the polymerization. It is preferable that the blocking agent be added at the end of polymerization. In this case, the predetermined end of polymerization may be based on an isocyanate rate. The reaction temperature during addition of the blocking agent is generally 50 to 150° C., and preferably 60 to 120° C. The reaction time is generally about 1 to 7 hours. In the reaction, the catalyst for urethane polymerization may be added to promote the reaction. In the reaction, any amount of plasticizer may be added.

From the viewpoint of favorable handling during use of the curable composition as an adhesive, the weight average molecular weight of the blocked isocyanate prepolymer (A) is preferably within the range of 4,000 to 15,000, and more preferably within the range of 5,000 to 10,000. In the present invention, the weight average molecular weight (Mw) is a value measured by a gel permeation chromatography (GPC).

The epoxy resin (B) is not particularly limited, and various epoxy resins can be used. When the epoxy resin is used as an adhesive, the epoxy resin is preferably a liquid epoxy resin at a normal temperature. Examples thereof include bisphenol type or biphenol type epoxy resins such as a tetramethyl biphenol type epoxy resin, a bisphenol A type epoxy resin, and a bisphenol F type epoxy resin; aliphatic polyol polyglycidyl ethers such as butanediol diglycidyl ether, neopentyl glycol diglycidyl ether, hexanediol diglycidyl ether, trimethylolpropane triglycidyl ether, and glycerol triglycidyl ether; cyclic structure-containing polyglycidyl compounds such as diglycidylaniline, resorcinol diglycidyl ether, and hydrogenated bisphenol A diglycidyl ether; cyclic structure-containing monofunctional glycidyl compounds such as alkyl phenol monoglycidyl ether; and polyglycidyl ester compounds such as neodecanoic acid glycidyl ester. Among these, a bisphenol type or biphenol type epoxy resin is preferably used since the curable composition capable of forming a cured product having excellent adhesive properties can be obtained. From the viewpoint of industrial availability, a bisphenol type epoxy resin is preferred. In particular, the amount of a bisphenol type epoxy resin is preferably 50% by mass or more, and more preferably 70% by mass or more, relative to the entire amount of the epoxy resin (B). Each of the epoxy resins may be used alone, or two or more types thereof may be used in combination.

Examples of the bisphenol type or biphenol type epoxy resin include those formed from various bisphenol compounds or biphenol compounds and epihalohydrin as resin raw materials. Specific examples thereof include epoxy resins represented by the following structural formula (1). Each of the bisphenol type or biphenol type epoxy resins may be used alone, or two or more types thereof may be used in combination.

[Formula 1]

(1)

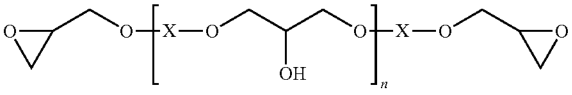

(wherein Xs are each independently a structural moiety represented by any of the following structural formulae (2-1) to (2-8), and n is the number of repetition.)

[Formula 2]

(2-1)

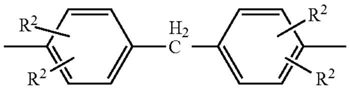

(2-2)

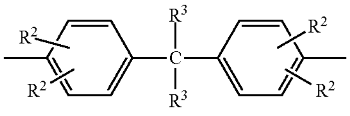

(2-3)

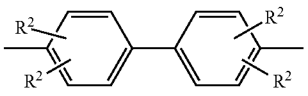

(2-4)

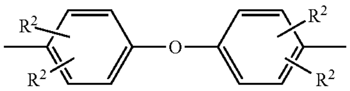

(2-5)

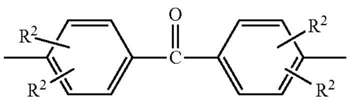

(2-6)

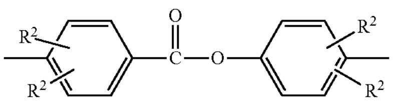

-continued (2-7)

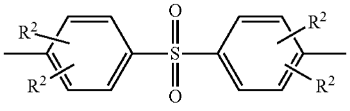

(2-8)

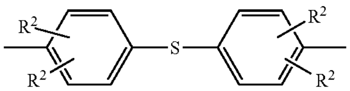

(wherein Res are each independently a hydrogen atom, or an alkyl group having 1 to 4 carbon atoms, an alkoxy group having 1 to 4 carbon atoms, and $R^3$s are each independently an alkyl group having 1 to 4 carbon atoms or an alkoxy group having 1 to 4 carbon atoms.)

Xs in the structural formula (1) are a structural moiety represented by any of the structural formulae (2-1) to (2-8). The structural moieties of Xs in the molecule may be the same as or different from each other. Among these, the structural moiety represented by the general formula (2-1) or (2-2) is preferred since the curable composition capable of forming a cured product having excellent adhesive properties can be obtained.

The bisphenol type or biphenol type epoxy resin can be produced by a method in which various bisphenol compounds or biphenol compounds and epihalohydrin are resin raw materials as described above. Specific examples of the method include a method (first method) in which a diglycidyl ether compound obtained by a reaction of the bisphenol compound or the biphenol compound with epihalohydrin is further reacted with the bisphenol compound or the biphenol compound, or a method (second method) in which the bisphenol compound or the biphenol compound is reacted with epihalohydrin to directly obtain an epoxy resin. Among the methods, the first method is preferred since the method easily controls the reactions and easily controls the epoxy equivalent of the obtained epoxy resin (B) to the preferable value.

Examples of the bisphenol compound or the biphenol compound used in the first or second method include compounds represented by any of the following structural formulae (3-1) to (3-8).

[Formula 3]

(3-1)

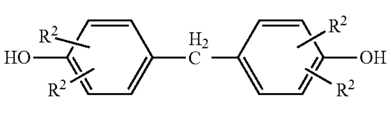

(3-2)

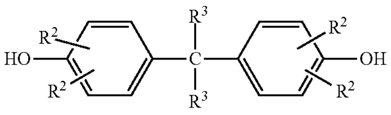

(3-3)

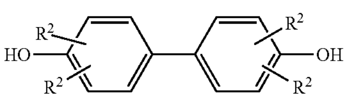

(3-4)

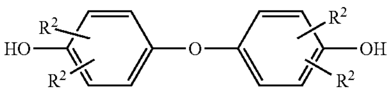

-continued (3-5)

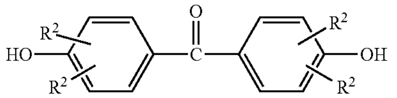

(3-6)

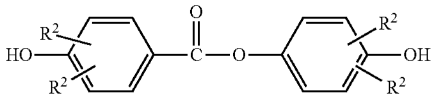

(3-7)

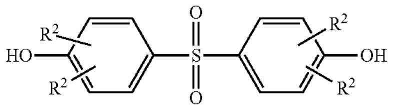

(3-8)

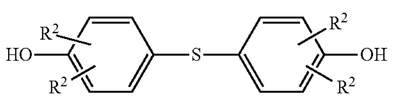

(wherein $R^2$s are each independently a hydrogen atom, or an alkyl group having 1 to 4 carbon atoms, an alkoxy group having 1 to 4 carbon atoms, and $R^3$s are each independently an alkyl group having 1 to 4 carbon atoms or an alkoxy group having 1 to 4 carbon atoms.)

The bisphenol compound or the biphenol compound may be used alone, or two or more types thereof may be used in combination. Among these, the compound represented by the general formula (3-1) or (3-2) is preferred since the curable composition capable of forming a cured product having excellent adhesive properties can be obtained.

In the first method, as the ratio in the reaction of the bisphenol compound or the biphenol compound with the diglycidyl ether compound, the mass ratio of the bisphenol compound or the biphenol compound to the diglycidyl ether compound is preferably within the range of 50/50 to 5/95. The reaction temperature is preferably about 120 to 160° C. A reaction catalyst such as tetramethylammonium chloride may be used.

The epoxy equivalent of the epoxy resin (B) is preferably within the range of 150 to 250 g/eq, and further preferably 160 to 200 g/eq since the curable composition capable of forming a cured product having excellent adhesive properties can be obtained.

As the epoxy resin (B), the bisphenol type or biphenol epoxy resin and a soft epoxy resin such as a urethane-modified epoxy resin or a rubber-modified epoxy resin may be used in combination as appropriate.

A structure of the urethane-modified epoxy resin is not particularly limited as long as it is a resin having a urethane bond and two or more epoxy groups in a molecule. In that the urethane bond and the epoxy groups can be efficiently introduced into one molecule, it is preferable that the resin be obtained by a reaction of a hydroxy group-containing epoxy compound with a urethane bond-containing compound having an isocyanate group that is obtained by a reaction of a polyhydroxy compound with a polyisocyanate.

Examples of the polyhydroxy compound include polyether polyols, polyester polyols, adducts formed from hydroxycarboxylic acid with an alkylene oxide, polybutadiene polyols, and polyolefin polyols.

The weight average molecular weight of the polyhydroxy compound is preferably within the range of 300 to 5,000, and more preferably within the range of 500 to 2,000.

The polyisocyanate is not particularly limited as long as it is a compound having two or more isocyanate groups. Examples of the polyisocyanate include aromatic polyisocyanates and polyisocyanates having an aromatic hydrocarbon group. Among these, aromatic polyisocyanates are preferred. Examples of the aromatic polyisocyanates include tolylene diisocyanate, diphenylmethane diisocyanate, and naphthalene diisocyanate.

By the aforementioned reaction, a urethane prepolymer having a free isocyanate group on the terminal is obtained. The urethane prepolymer is reacted with an epoxy resin having at least one hydroxy group in one molecule (for example, diglycidyl ether of bisphenol A, diglycidyl ether of bisphenol F, diglycidyl ether of aliphatic polyhydric alcohol, and glycidol) to obtain a urethane-modified epoxy resin.

The epoxy equivalent of the urethane-modified epoxy resin is preferably within the range of 200 to 250 g/eq.

The rubber-modified epoxy resin is not particularly limited as long as it is an epoxy resin having two or more epoxy groups and a rubber skeleton. Examples of rubber forming the skeleton include polybutadiene acrylonitrile rubber (NBR) and carboxyl group-terminated NBR (CTBN). The rubber-modified epoxy resin may be used alone, or two or more types thereof may be used in combination.

The epoxy equivalent of the rubber-modified epoxy resin is preferably within the range of 200 to 350 g/eq. A method for producing the rubber-modified epoxy resin is not particularly limited. Examples thereof include a method by a reaction of the rubber with epoxy in a large amount of epoxy. The epoxy (for example, epoxy resin) used to produce the rubber-modified epoxy resin is not particularly limited.

Examples of the curing agent (01) include polyamine compounds, amide compounds, acid anhydrides, phenolic hydroxy group-containing resins, phosphorus compounds, imidazole compounds, imidazoline compounds, a urea compounds, organic acid metal salts, Lewis acid, and amine complex salts.

Examples of the polyamine compound include aliphatic amine compounds such as trimethylenediamine, ethylenediamine, N,N,N',N'-tetramethylethylenediamine, pentamethyldiethylenetriamine, triethylenediamine, dipropylenediamine, N,N,N',N'-tetramethylpropylenediamine, tetramethylenediamine, pentanediamine, hexamethylenediamine, trimethylhexamethylenediamine, N,N,N',N'-tetramethylhexamethylenediamine, N,N-dimethylcyclohexylamine, diethylenetriamine, triethylenetetramine, tetraethylenepentamine, dimethylaminopropylamine, diethylaminopropylamine, dibutylaminopropylamine, 1,4-diazabicyclo[2,2,2]octane(triethylenediamine), polyoxyethylenediamine, polyoxypropylenediamine, bis(2-dimethylaminoethyl) ether, dimethylaminoethoxy ethoxyethanol, triethanolamine, and dimethylaminohexanol;

alicyclic and heterocyclic amine compounds such as piperidine, piperazine, menthanediamine, isophoronediamine, methylmorpholine, ethylmorpholine, N,N',N''-tris(dimethylaminopropyl)hexahydro-s-triazine, a 3,9-bis(3-aminopropyl)-2,4,8,10-tetraoxaspiro[5,5]undecane adduct, N-aminoethylpiperazine, trimethylaminoethylpiperazine, bis(4-aminocyclohexyl)methane, N,N'-dimethylpiperazine, and 1,8-diazabicyclo-[5.4.0]-undecene (DBU);

aromatic amine compounds such as o-phenylenediamine, m-phenylenediamine, p-phenylenediamine, diaminodiphenylmethane, diaminodiphenyl sulfone, benzyldimethylamine, dimethylbenzylamine, m-xylenediamine, pyridine, picoline, and α-methylbenzylmethylamine; and modified amine compounds such as an epoxy compound-added polyamine, a polyamine obtained by Michael addition, a polyamine obtained by Mannich addition, a thiourea-added polyamine, a ketone-capped polyamine, dicyandiamide, guanidine, an organic acid hydrazide, diaminomaleonitrile, amineimide, a boron trifluoride-piperidine complex, and a boron trifluoride-monoethylamine complex.

Examples of the amide compounds include dicyandiamide and polyamidoamines. Examples of the polyamidoamines include polyamidoamines obtained by a reaction of an aliphatic dicarboxylic acid such as succinic acid, glutaric acid, adipic acid, pimelic acid, suberic acid, or azelaic acid, or a carboxylic acid compound such as a fatty acid or a dimer acid with an aliphatic polyamine or a polyamine having a polyoxyalkylene chain.

Examples of the acid anhydrides include phthalic anhydride, trimellitic anhydride, pyromellitic anhydride, maleic anhydride, tetrahydrophthalic anhydride, methyltetrahydrophthalic anhydride, methyl nadic anhydride, hexahydrophthalic anhydride, and methylhexahydrophthalic anhydride.

Examples of the phenolic hydroxy group-containing resins include polyhydric phenol compounds such as a phenol novolac resin, a cresol novolac resin, an aromatic hydrocarbon formaldehyde resin-modified phenolic resin, a dicyclopentadiene phenol-added resin, a phenol aralkyl resin (xylok resin), a naphthol aralkyl resin, a trimethylolmethane resin, a tetraphenylolethane resin, a naphthol novolac resin, a naphthol-phenol co-condensed novolac resin, a naphthol-cresol co-condensed novolac resin, a biphenyl-modified phenolic resin (a polyhydric phenol compound having a phenolic nucleus linked through a bismethylene group), a biphenyl-modified naphthol resin (a polyhydric naphthol compound having a phenolic nucleus linked through a bismethylene group), an aminotriazine-modified phenolic resin (a polyhydric phenol compound having a phenolic nucleus linked through melamine, benzoguanamine, or the like), and an alkoxy group-containing aromatic ring-modified novolac resin (a polyhydric phenol compound in which a phenolic nucleus and an alkoxy group-containing aromatic ring are linked through formaldehyde).

Examples of the phosphorus compounds include alkyl phosphines such as ethylphosphine and butylphosphine, primary phosphines such as phenylphosphine; dialkyl phosphines such as dimethylphosphine and dipropylphosphine; secondary phosphines such as diphenylphosphine and methylethylphosphine; and tertiary phosphines such as trimethylphosphine, triethylphosphine, and triphenylphosphine.

Examples of the imidazole compounds include imidazole, 1-methylimidazole, 2-methylimidazole, 3-methylimidazole, 4-methylimidazole, 5-methylimidazole, 1-ethylimidazole, 2-ethylimidazole, 3-ethylimidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1H-imidazole, 4-methyl-2-phenyl-1H-imidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, a 2-phenylimidazole isocyanuric acid adduct, a 2-methylimidazole isocyanuric acid adduct, 2-phenyl-4,5-dihydroxymethylimidazole, 2-phenyl-4-methyl-5-hydroxymethylimidazole, 1-cyanoethyl-2-phenyl-4,5-di(2-cyanoethoxy)methylimidazole, 1-dodecyl-2-methyl-3-benzylimidazolium chloride, and 1-benzyl-2-phenylimidazole hydrochloride.

Examples of the imidazoline compounds include 2-methylimidazoline and 2-phenylimidazoline.

Examples of the urea compounds include p-chlorophenyl-N,N-dimethyl urea, 3-phenyl-1,1-dimethyl urea, 3-(3,4-dichlorophenyl)-N,N-dimethyl urea, and N-(3-chloro-4-methylphenyl)-N',N'-dimethyl urea.

The curing agent may be used alone, or two or more types thereof may be used in combination. Among these, dicyandiamide is preferred since a curable composition capable of forming a cured product having excellent adhesive properties can be obtained.

Examples of the curing accelerator (C2) include amine compounds, imidazole compounds, and urea compounds.

Examples of the amine compounds include N,N,N',N'-tetramethylethylenediamine, pentamethyldiethylenetriamine, N,N,N',N'-tetramethylpropylenediamine, N,N,N',N'-tetramethylhexamethylenediamine, N,N-dimethylcyclohexylamine, 1,4-diazabicyclo[2,2,2]octane (triethylenediamine), bis(2-dimethylaminoethyl) ether, dimethylaminoethoxy ethoxyethanol, triethanolamine, and dimethylaminohexanol.

As the imidazole compounds, the same compounds as the examples of the imidazole compounds can be used.

As the urea compounds, the same compounds as the examples of the urea compounds can be used.

The curable composition of the present invention may contain an organic solvent, an ultraviolet absorber, an antioxidant, a silicon-containing additive, a fluorine-containing additive, a flame retarder, a plasticizer, a silane-coupling agent, organic beads, inorganic fine particles, an inorganic filler, a rheology controller, a degassing agent, an antifogging agent, a colorant, or the like, as appropriate. The various components may be added in any amount according to desired performance.

A method for preparing the curable composition of the present invention may be a method in which the blocked isocyanate prepolymer (A), the epoxy resin (B), and the curing agent (C1) and/or the curing accelerator (C2), and if necessary, the optional component to be contained are uniformly mixed with a pot mill, a ball mill, a bead mill, a roll mill, a homogenizer, a super mill, a homodisper, a utility mixer, a Banbury mixer, a kneader, or the like.

An application of the curable composition of the present invention is not particularly limited. The curable composition can be used in various applications such as a coating material, a coating agent, a molding material, an insulating material, a sealant, a sealing agent, and a fiber-bonding agent. In particular, the curable composition can be suitably used as an adhesive for a structural member in the fields of automobiles, electric trans, civil engineering and construction, electronics, airplanes, and aerospace industry by using characteristics including excellent softness and toughness of a cured product.

For example, even when an adhesive of the present invention is used in adhesion between different materials such as a metal and a non-metal, high adhesive properties can be maintained without being affected by a change of temperature environmental, and peeling is unlikely to occur. The adhesive of the present invention can be used as an adhesive for general office use, a medical adhesive, an adhesive for carbon fibers, or an adhesive for an electronic material, in addition to the adhesive for a structural member. Examples of the adhesive for an electronic material include an adhesive for an interlayer of a multilayer substrate such as a build-up substrate, an adhesive for bonding of an optical component, an adhesive for bonding of an optical disk, an adhesive for mounting of a printed wiring board, a die bonding adhesive, an adhesive for semiconductor such as an underfill material, and an adhesive for mounting such as an underfill material for BGA reinforcement, an anisotropic conductive film, and an anisotropic conductive paste.

EXAMPLE

Hereinafter, the present invention will be specifically described by Examples and Comparative Examples. The present invention is not limited to the examples listed below.

In Examples, the number average molecular weight (Mn) is a value measured by a gel permeation chromatography (GPC) under the following condition.

Measuring equipment: "HLC-8220" manufactured by Tosoh Corporation

Column: "Guard column $H_{XL}$-H" manufactured by Tosoh Corporation

"TSKgel G5000HXL" manufactured by Tosoh Corporation

"TSKgel G4000HXL" manufactured by Tosoh Corporation

"TSKgel G3000HXL" manufactured by Tosoh Corporation

"TSKgel G2000HXL" manufactured by Tosoh Corporation

Detector: RI (differential refractometer)

Data processing: "SC-8010" manufactured by Tosoh Corporation

Measurement condition: Column temperature: 40° C.

Solvent: tetrahydrofuran

Flow rate: 1.0 mL/min

Standard: polystyrene

Sample: a sample (100 μL) obtained by filtration of tetrahydrofuran solution in an amount of 0.4% by mass in terms of solid content through a microfilter

Synthesis Example 1: Synthesis of Blocked Isocyanate Prepolymer (1)

In a nitrogen atmosphere, 431 parts by mass of polytetramethylene glycol ("PTMG-2000" available from Mitsubishi Chemical Corporation, Mw: 2,000, the number of functional group: 2), 324 parts by mass ("T-1500" available from Mitsui Chemicals & SKC Polyurethanes Inc., Mw: 1,500, the number of functional group: 3), and 143 parts by mass of tolylene diisocyanate ("T-80" available from Mitsui Chemicals & SKC Polyurethanes Inc.) were mixed, and 0.1 parts by mass of dioctyltin diacetate ("NEOSTANN U-820" available from Nitto Kasei Co., Ltd.) was added as a catalyst, to cause a reaction at 80° C. for 5 hours. Subsequently, 102 parts by mass of p-tert-butylphenol ("DIC-PTBP" available from DIC Corporation) was added as a blocking agent, and a reaction was caused at 90° C. for 5 hours, to obtain a blocked isocyanate prepolymer (1).

Synthesis Examples 2 to 8: Synthesis of Blocked Isocyanate Prepolymers (2) to (8)

Components were mixed at a proportion shown in Table 1 below, and blocked isocyanate prepolymers (2) to (8) were obtained in the same manner as in Synthesis Example 1.

The compositions of the blocked isocyanate prepolymers adjusted in Synthesis Examples 1 to 8 are shown in Table 1.

TABLE 1

| | | | Syn. Ex. 1 | Syn. Ex. 2 | Syn. Ex. 3 | Syn. Ex. 4 | Syn. Ex. 5 | Syn. Ex. 6 | Syn. Ex. 7 | Syn. Ex. 8 |
|---|---|---|---|---|---|---|---|---|---|---|
| Blocked isocyanate prepolymer | | | (1) | (2) | (3) | (4) | (5) | (6) | (7) | (8) |
| Composition (part by mass) | Polyol compound (a1) | PTMG-2000 | 431 | 313 | | | | | | 654 |
| | | PTMG-3000 | | | 585 | 537 | 521 | | 800 | |
| | | D-3000 | | | | | | 800 | | |
| | Polyisocyanate compound (a2) | HDI | | 136 | | | | | | |
| | | IPDI | | | 162 | 167 | | 120 | 120 | 218 |
| | | TDI | 143 | | | | 128 | | | |
| | Branching agent (a3) | T-400 | | | 70 | | | | | |
| | | T-700 | | | | 125 | | | | |
| | | T-1500 | 324 | 282 | | | 287 | | | |
| | | TMP | | | | | | | | 30 |
| | Blocking agent (a4) | PTBP | 102 | | | 171 | | 80 | 80 | 98 |
| | | NX-2026 | | 269 | 183 | | | | | |
| | | DMP | | | | | 64 | | | |
| Amount (mol) of NCO group | | | 1.52 | 1.84 | 1.59 | 1.68 | 1.60 | 2.03 | 2.03 | 1.48 |
| Amount (mol %) of reactive functional groups in branching agent (a3) | | | 60 | 64 | 57 | 60 | 62 | — | — | 50 |

Abbreviations shown in Table 1 means as follows.

PTMG-2000: polytetramethylene glycol ("PTMG-2000" available from Mitsubishi Chemical Corporation, Mw: 2,000, the number of functional group: 2)

PTMG-3000: polytetramethylene glycol ("PTMG-3000" available from Mitsubishi Chemical Corporation, Mw: 3000, the number of functional group: 2)

TMP: trimethylolpropane (TMP (flake) available from Mitsubishi Gas Chemical Company, Inc.)

T-400: polypropylene glycol ("T-400" available from Mitsui Chemicals & SKC Polyurethanes Inc., Mw: 400, the number of functional group: 3)

T-700: polypropylene glycol ("T-700" available from Mitsui Chemicals & SKC Polyurethanes Inc., Mw: 700, the number of functional group: 3)

T-1500: polypropylene glycol ("T-1500" available from Mitsui Chemicals & SKC Polyurethanes Inc., Mw: 1500, the number of functional group: 3)

HDI: hexamethylene diisocyanate ("Desmodur H" available from Sumika Covestro Urethane Co., Ltd.)

IPDI: isophorone diisocyanate ("Desmodur I" available from Sumika Covestro Urethane Co., Ltd.)

TDI: tolylene diisocyanate ("T-80" available from Mitsui Chemicals & SKC Polyurethanes Inc.)

PTBP: p-tert-butylphenol ("DIC-PTBP" available from DIC Corporation)

NX-2026: cardanol ("NX-2026" available from Cardolite)

DMP: 3,5-dimethylpyrazole ("3,5-dimethylpyrazole" available from Otsuka Chemical Co., Ltd.)

The "amount of NCO group" in Table 1 indicates the amount by mole of an isocyanate group in a polyisocyanate compound (a2) relative to 1 mol of a total amount of a hydroxy group in a polyol compound (a1) and reactive functional groups in a branching agent (a3).

The "amount of reactive functional groups in branching agent (a3)" in Table 1 indicates the amount of the reactive functional groups in the branching agent (a3) relative to the total amount of the hydroxy group in the polyol compound (a1) and the reactive functional groups in the branching agent (a3).

Example 1: Preparation of Curable Composition (1)

20 parts by mass of the blocked isocyanate prepolymer (1) obtained in Synthesis Example 1, 80 parts by mass of bisphenol A type epoxy resin ("EPICLON 850-S" available from DIC Corporation), 5 parts by mass of dicyandiamide as a curing agent, 1 part by mass of 3,4-dichlorophenyl-N,N-dimethyl urea as a curing accelerator, and 20 parts by mass of calcium carbonate as a filler were mixed, to obtain a curable composition (1).

Example 2: Preparation of Curable Composition (2)

20 parts by mass of the blocked isocyanate prepolymer (1) obtained in Synthesis Example 1, 70 parts by mass of bisphenol A type epoxy resin ("EPICLON 850-S" available from DIC Corporation), 10 parts by mass of rubber-modified epoxy resin ("EPICLON TSR-601" available from DIC Corporation), 5 parts by mass of dicyandiamide as a curing agent, 1 part by mass of 3,4-dichlorophenyl-N,N-dimethyl urea as a curing accelerator, and 20 parts by mass of calcium carbonate as a filler were mixed, to obtain a curable composition (2).

Examples 3 to 6: Preparation of Curable Compositions (3) to (6)

Curable compositions (3) to (6) were obtained in the same manner as in Example 1 except that the blocked isocyanate prepolymers (2) to (5) obtained in Synthesis Examples 2 to 5, respectively, were used in mixing amounts shown in Table 2 instead of the blocked isocyanate prepolymer (1) used in Example 1.

Comparative Examples 1 to 3: Preparation of Curable Compositions (R1) to (R3)

Curable compositions (R1) to (R3) were obtained in the same manner as in Example 1 except that the blocked isocyanate prepolymers (6) to (8) obtained in Synthesis Examples 6 to 8, respectively, were used in mixing amounts shown in Table 2 instead of the blocked isocyanate prepolymer (1) used in Example 1.

The curable compositions (1) to (6) and (R1) to (R3) obtained in Examples and Comparative Examples were used to perform the following evaluations.

[Method for Evaluating Adhesive Properties]

Adhesive properties were evaluated in accordance with a tensile shear test and a T-shaped peeling test.

<Production of Specimen>

The curable composition obtained in each of Examples and Comparative Examples was cured at 170° C. over 30 minutes in accordance with JIS K6859 (1994) (method for testing creep rupture of adhesive) and JIS K6854-3 (1999) (test of peeling adhesive strength of adhesive) to obtain a specimen for a tensile shear test and a T-shaped peeling test.

<Tensile Shear Test>

The tensile shear strength of the specimen was measured with "AUTOGRAPH AG-XPlus 100 kN" manufactured by SHIMADZU CORPORATION under a condition of 25° C. by a method of JIS K6859 (1994) (test of creep rupture of adhesive).

<T-Shaped Peeling Test>

The peeling strength of the specimen was measured with "AUTOGRAPH AG-IS 1 kN" manufactured by SHIMADZU CORPORATION under a condition of 25° C. by a method of JIS K6854-3 (1999) (test of peeling adhesive strength of adhesive).

[Method for Confirming Cohesive Failure Area Ratio (CF Area Ratio)]

For the specimen used in <Tensile shear test>, a cohesive failure area ratio (CF area ratio) was visually confirmed, and a failure state of the specimen was confirmed. As the cohesive failure area ratio is higher, the failure state is better.

The compositions and the evaluation results of the curable compositions (1) to (6) produced in Examples 1 to 6, respectively, and the curable compositions (R1) to (R3) produced in Comparative Examples 1 to 3, respectively, are shown in Table 2.

TABLE 2

| | | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Curable composition | | (1) | (2) | (3) | (4) | (5) | (6) | (R1) | (R2) | (R3) |
| Composition (part by mass) | Blocked isocyanate prepolymer (1) | 20 | 20 | | | | | | | |
| | Blocked isocyanate prepolymer (2) | | | 20 | | | | | | |
| | Blocked isocyanate prepolymer (3) | | | | 20 | | | | | |

TABLE 2-continued

| | | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| | Blocked isocyanate prepolymer (4) | | | | | 20 | | | | |
| | Blocked isocyanate prepolymer (5) | | | | | | 20 | | | |
| | Blocked isocyanate prepolymer (6) | | | | | | | 20 | | |
| | Blocked isocyanate prepolymer (7) | | | | | | | | 20 | |
| | Blocked isocyanate prepolymer (8) | | | | | | | | | 20 |
| | TSR-601 | | 10 | | | | | | | |
| | 850-S | 80 | 70 | 80 | 80 | 80 | 80 | 80 | 80 | 80 |
| | DICY | 5 | 5 | 5 | 5 | 5 | 5 | 5 | 5 | 5 |
| | DCMU | 1 | 1 | 1 | 1 | 1 | 1 | 1 | 1 | 1 |
| | $CaCO_3$ | 20 | 20 | 20 | 20 | 20 | 20 | 20 | 20 | 20 |
| Evaluation | Peeling strength (N/2.5 cm) | 180 | 210 | 190 | 170 | 180 | 170 | 80 | 60 | 110 |
| | Tensile shear strength (MPa) | 24 | 26 | 25 | 24 | 23 | 27 | 19 | 21 | 20 |
| | CF area ratio (%) | 100 | 100 | 100 | 100 | 100 | 100 | 50 | 50 | 70 |

Abbreviations shown in Table 2 means as follows.

TSR-601: rubber-modified epoxy resin ("EPICLON TSR-601" available from DIC Corporation)

850-S: bisphenol A type epoxy resin ("EPICLON 850-S" available from DIC Corporation)

DICY: dicyandiamide

DCMU: 3,4-dichlorophenyl-N,N-dimethyl urea

Examples 1 to 6 shown in Table 2 are examples of the curable composition containing the blocked isocyanate prepolymer of the present invention. The curable compositions were confirmed to have excellent adhesive properties.

On the other hand, Comparative Examples 1 to 2 shown in Table 2 are examples of a curable composition containing a blocked isocyanate prepolymer in which a blocking agent (a3) is not used. Comparative Example 3 is an example of a curable composition containing a blocked isocyanate prepolymer in which the amount of reactive functional groups in the branching agent (a3) is 50 mol % of the total amount of the hydroxy group in the polyol compound (a1) and the reactive functional groups in the branching agent (a3). The curable compositions were confirmed to have insufficient adhesive properties.

The invention claimed is:

1. A curable composition comprising:

a blocked isocyanate prepolymer (A) containing a polyol compound (a1), a polyisocyanate compound (a2), a branching agent (a3), and a blocking agent (a4);

an epoxy resin (B); and a curing agent (C1) and/or a curing accelerator (C2), wherein the polyol compound (a1) is polytetramethylene glycol, the branching agent (a3) is a compound having at least three reactive functional groups capable of reacting with an isocyanate group in the polyisocyanate compound (a2), an amount by mole of the isocyanate group in the polyisocyanate compound (a2) is 2 mol or less relative to 1 mol of a total amount by mole of a hydroxy group in the polyol compound (a1) and the reactive functional groups capable of reacting with the isocyanate group in the branching agent (a3), and an amount of the reactive functional groups in the branching agent (a3) is more than 50 mol % of the total amount of the hydroxy group in the polyol compound (a1) and the reactive functional groups in the branching agent (a3).

2. The curable composition according to claim 1, wherein a number average molecular weight of the polytetramethylene glycol is within a range of 1,000 to 4,000.

3. The curable composition according to claim 1, wherein the reactive functional groups in the branching agent (a3) are one or more selected from the group consisting of a hydroxy group, an amino group, and carboxyl group.

4. The curable composition according to claim 1, wherein a number average molecular weight of the branching agent (a3) is within a range of 300 to 3,000.

5. The curable composition according to claim 1, wherein the polyisocyanate compound (a2) is diisocyanate.

6. The curable composition according to claim 1, wherein the blocking agent (a4) is one or more selected from the group consisting of a phenol compound, an oxime compound, an amine compound, and an active methylene compound.

7. The curable composition according to claim 6, wherein the blocking agent (a4) is a monovalent compound.

8. The curable composition according to claim 1, wherein the curing agent (C1) contains dicyandiamide.

9. The curable composition according to claim 1, wherein the curing accelerator (C2) is one or more selected from the group consisting of a urea compound, an imidazole compound, and an amine compound.

10. The curable composition according to claim 1, wherein an epoxy equivalent of the epoxy resin (B) is within a range of 150 to 250 g/eq.

11. The curable composition according to claim 1, wherein a mass ratio [(A)/(B)] of the blocked isocyanate prepolymer (A) to the epoxy resin (B) is within a range of 10/90 to 30/70.

12. A cured product of the curable composition according to claim 1.

13. An adhesive comprising the curable composition according to claim 1.

14. The curable composition according to claim 2, wherein the reactive functional groups in the branching agent (a3) are one or more selected from the group consisting of a hydroxy group, an amino group, and carboxyl group.

15. The curable composition according to claim 2, wherein a number average molecular weight of the branching agent (a3) is within a range of 300 to 3,000.

16. The curable composition according to claim 2, wherein the polyisocyanate compound (a2) is diisocyanate.

17. The curable composition according to claim 2, wherein the blocking agent (a4) is one or more selected from the group consisting of a phenol compound, an oxime compound, an amine compound, and an active methylene compound.

18. The curable composition according to claim 2, wherein the curing agent (C1) contains dicyandiamide.

19. The curable composition according to claim 2, wherein the curing accelerator (C2) is one or more selected from the group consisting of a urea compound, an imidazole compound, and an amine compound.

20. The curable composition according to claim 2, wherein an epoxy equivalent of the epoxy resin (B) is within a range of 150 to 250 g/eq.

* * * * *